May 28, 1968 S. J. BRYM 3,386,080

PULSE DISTRIBUTING SCANNER

Filed June 11, 1964 3 Sheets-Sheet 1

INVENTOR.
Stanley J. Brym

BY

Blair & Buckles
ATTORNEYS

INVENTOR.
Stanley J. Brym
BY
Blair & Buckles
ATTORNEYS.

PULSE DISTRIBUTING SCANNER

Filed June 11, 1964 3 Sheets-Sheet 3

INVENTOR
BY *Stanley J. Brym*

*Blair & Buckles*
ATTORNEYS.

United States Patent Office 3,386,080
Patented May 28, 1968

3,386,080

PULSE DISTRIBUTING SCANNER

Stanley J. Brym, East Norwalk, Conn., assignor, by direct and mesne assignments, to Control Data Corporation, Minneapolis, Minn., a corporation of Minnesota Filed June 11, 1964, Ser. No. 374,498
16 Claims. (Cl. 340—147)

ABSTRACT OF THE DISCLOSURE

A combination electromechanical and electronic pulse distributing scanner for supplying pulses sequentially to a substantial number of output lines. The distribution of pulses to the output lines is determined by an electronic counting circuit which sequentially pulses a number of lines fewer in number relative to the output lines. The pulsed lines are routed to selected output lines by means of the electromechanical distributor functioning as a pulse divider.

This invention relates to a pulse distributor and more particularly to a scanner having a substantial number of output terminals from which pulses or information bits are transmitted sequentially.

Pulse distributing scanners have wide use in the fields of data transmission and compilation as well as in computers and like data handling devices. The scanners are, for example, used in conjunction with readout devices having sensing elements or the like disposed to read out data stored on a media such as punched cards or tape. Such data in the form of discrete information bits or units is generally arranged in columns and rows, and in order for the data to have useful meaning, the columns and rows are read or sensed in a predetermined sequence by the scanner. Similarly, data retained in a memory or storage system having a substantial number of information outputs is sensed or otherwise readied for transmission in sequential order by a scanner. Moreover, information prepared by dial settings or set up by complex switch mechanisms may be sensed sequentially using a scanner.

Examples of data handling systems employing scanners are found in Patent No. 3,109,089 issued Oct. 29, 1963, to Andrew C. Reynolds, Jr., et al. for "Data Transmission Apparatus"; application of Andrew C. Reynolds, Jr., et al. for "System and Apparatus for Automatic Data Collection," Ser. No. 863,227, filed Dec. 31, 1959; application of Andrew C. Reynolds, Jr., et al. for "Automatic Card Reading System," Ser. No. 196,672, filed May 22, 1962; and application of Oliver H. Chalker, Jr., et al. for "System and Apparatus for Automatic Data Collection," Ser. No. 229,001 filed October 8, 1962, now Patent No. 3,303,472. All of the above-noted applications are assigned to the same assignee as the instant application.

Various types of prior art scanners have employed a mechanical pulse distributor which comprises commutator-like contact segments mechanically traversed by a sliding contact such as a carbon brush to provide sequential pulse outputs. Such commutator-like pulse distributors possess several disadvantages. They are subject to wear because of the sliding contact of the brush, and brush particles, as well as particles from the contact segments themselves, may in time cause bridging between segments which results in erroneous and unreliable outputs from the distributor.

Relay "trees" have also been used for such pulse distributing functions. Such relay trees require extremely fast operating relays if they are to be compatible with most data handling systems. Although such fast operating relays are available, they are quite expensive and add substantial cost to the scanner.

Still another drawback of such prior art devices is that the switch contacts are typically energized during switch change. This results in arcing and pitting of the contacts, thereby reducing reliability and life of the switching components. Further, such arcing causes switch noise resulting in spurious pulse outputs from the scanner.

Other prior art approaches have included a relay matrix for distributing pulses. Such prior art devices require a large number of relays for the number of pulse output lines and are consequently more expensive.

Moreover, with prior art mechanical and electromechanical pulse distributors, it is difficult to achieve and maintain uniformity of pulse outputs, a critical factor in most data handling systems. Such prior art devices are also bulky and do not lend themselves to compact, modular construction.

Still another prior art approach has been directed to the development of all-electronic pulse distributors. Such units readily achieve the requisite operating speed and pulse uniformity for application in data handling systems, but are very expensive since high quality electronic components are required.

Accordingly, it is an object of the present invention to provide a pulse distributor for supplying pulses sequentially to a substantial number of output lines.

Another object of the invention is to provide a pulse distributor of the above character utilizing both electromechanical and electronic components to achieve fast operation and pulse uniformity.

A further object of the invention is to provide a pulse distributor of the above character utilizing a minimum number of components which are relatively inexpensive and reliable in operation.

Another object of the invention is to provide a pulse distributor of the above character having control means whereby the sequential pulse routing is established prior to the generation of a pulse.

A further object is to provide a pulse distributing scanner of the above character particularly suited for application in data handling systems.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Broadly stated, the invention provide a pulse distributing scanner having a plurality of pulse routing circuits for distributing pulses to a plurality of pulse output terminals in sequence. These pulse routing circuits are controlled by a chain of control relays with each relay having associated transfer contacts operating in selected ones but not all of the pulse routing circuits. An electronic timing circuit generates a series of timing control pulses. These timing control pulses serve to trigger an electronic counting circuit for developing a predetermined repeating sequence of output signals. The counting output signals, together with the timing control pulses are applied as inputs to a series of gate circuits, the gate outputs being connected to individual pulse routing circuits. The sequentially varying character of inputs to the gate circuits enables each gate in repeating sequence to apply a pulse to each pulse routing circuit, in a repeating sequence.

The sequentially varying output signal conditions from the counting circuit also operate control relays in a predetermined time relationship to the routing of pulses in the individual pulse routing circuit. More specifically, each control relay is operated only during the period of each sequence when its operatively associated transfer contacts in the individual pulse routing circuits are not energized. Each relay having associated transfer contacts in pulse routing circuits awaiting to distribute particular pulse outputs in any one given sequence is thus not operated until after distribution of those particular pulse outputs and well before these pulse routing circuits are required to distribute pulse outputs in the next sequence.

Transfer contacts for the control relay chain are interconnected so that the control relays are operated in predetermined succession at the times determined by the sequentially varying character of the output signals from the electronic counting circuit.

The chain of control relays is provided with a self-holding circuit established by a transfer contact of the operated relay and through the transfer contacts of all succeeding relays in the chain. This insures that each operated relay is held for the duration of time spanning the time during which pulse outputs are distributed through the transfer contacts of the pulse routing circuits. Subsequently, the holding circuit for each operated relay is broken by operation of a succeeding control relay.

A further feature of my pulse distributing scanner provides for the automatic termination of operation when the final pulse output is distributed. More specifically, the final pulse output is applied so as to inhibit the further generation of timing control pulses.

Figure 1:
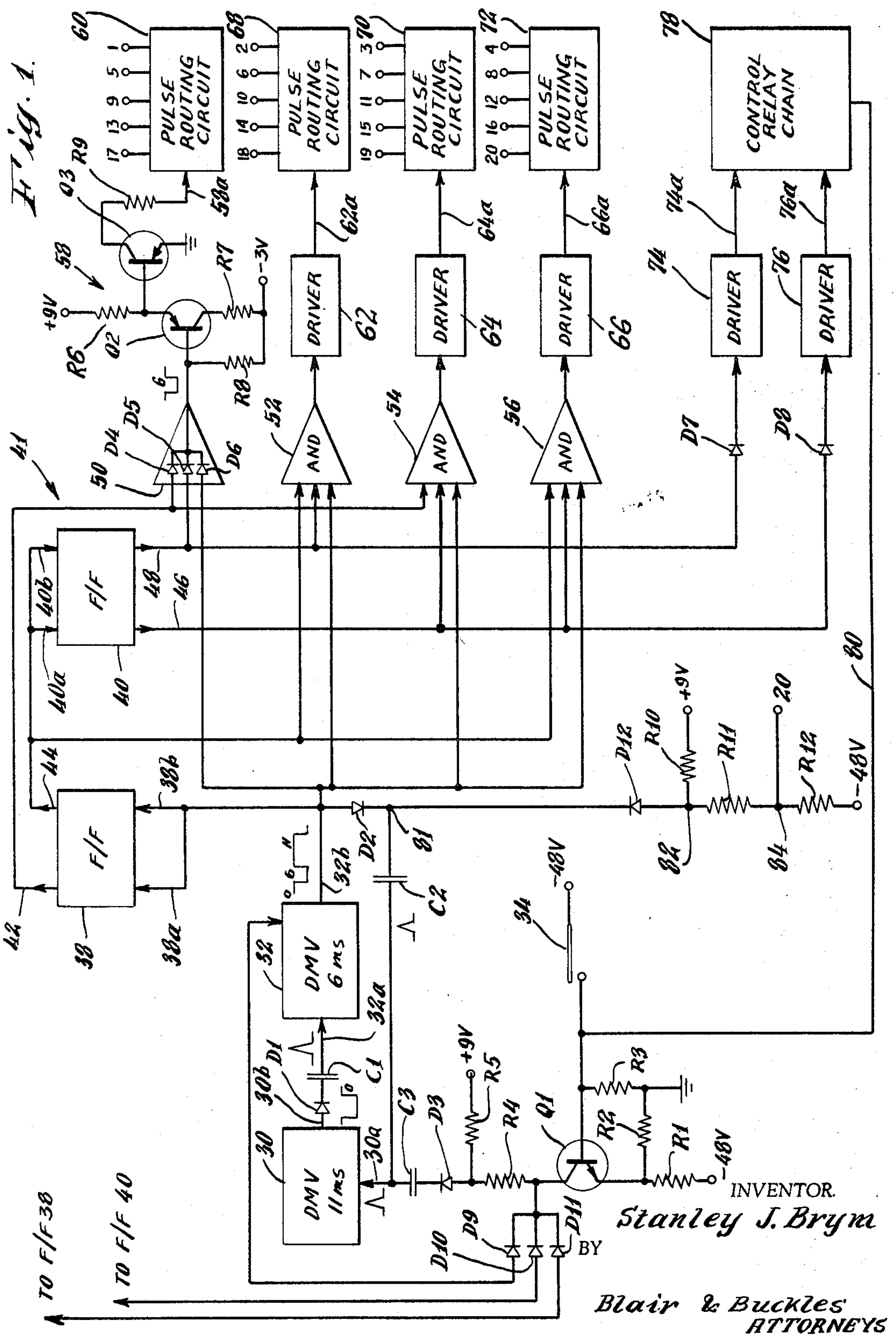
FIGURE 1 is a logic block diagram, partially in schematic form, of a pulse distributing scanner constructed according to the present invention.

Turning to FIGURE 1, the timing control functions of the pulse distributing scanner are originated by a pair of delay multivibrators 30 and 32. These delay multivibrators are of conventional construction having a normally conducting electronic valve, such as a transistor, and a cross-coupled normally non-conducting transistor. This normal conduction condition of the cross-coupled transistors signifies the quiescent or stable state of the delay multivibrator. On appropriate application of an input triggering pulse, this normal conduction condition of the two transistors is upset such that the normally conducting transistor goes into non-conduction and the normally non-conducting transistor goes into conduction. As is well known in the art, the time that the transistors remain in their upset or unstable conducting condition is determined by an R.C. timing circuit which functions to return the transistors to their respective normal conduction conditions on the expiration of the predetermined time duration. Typically, the significant output from the delay multivibrator is the pulse generated during the interval that the transistors are in their upset condition, i.e., while the delay multivibrator is in its unstable state.

As seen in FIGURE 1, a positive spiked pulse on input 30*a* of delay multivibrator 30 produces a negative-going pulse on its output 30*b*. The timing circuit of delay multivibrator 30 may be adjusted such that the pulse duration of the output pulse appearing on line 30*b* is 11 milliseconds.The trailing edge of this output pulse being a positive transition, is passed by a series connected diode D1 and capacitor C1 to provide a positive spiked pulse as a triggering input to delay multivibrator 32. In similar fashion, the delay multivibrator 32 generates a negative-going pulse which may be of 6 milliseconds duration. A capacitor C2 charges through the back resistance of a diode D2 such that a positive transition on line 32*b* produces a positive spiked pulse at the input 30*a* of delay multivibrator 30. Acccordingly, operation of the delay multivibrators 30 and 32 is self-perpetuating, that is, once delay multivibrator 30 is triggered by other circuitry to be described, the output from delay multivibrator 30 triggers delay multivibrator 32, whose output, in turn, retriggers delay multivibrator 30. In the timing diagram of FIGURE 3, the output from the delay multivibrator 32 is in the form of alternating positive or negative potential levels wherein the duration of each positive potential level is determined by the period of delay multivibrator 30 and the duration of each negative potential level is determined by the period of delay multivibrator 32, to wit, 11 milliseconds and 6 milliseconds, respectively.

Still referring to FIGURE 1, a start switch 34, manually operated or automatically operated by external logic (not shown) closes to apply a negative 48-volt potential to the base of a transistor Q1 driving it to cut off. When switch 34 is open, however, transistor Q1 is biased into conduction by the potential divider comprised of resistors R1, R2 and R3 connected between a negative 48-volt potential and the base of transistor Q1. The junction between resistors R1 and R2 is connected to the emitter of transistor Q1 while the junction between resistors R2 and R3 is grounded. Accordingly, with switch 34 open, the emitter of transistor Q1 is negative with respect to its base so as to bias it into conduction. The collector of transistor Q1 is returned through resistors R4 and R5 to a positive 9-volt potential. With transistor Q9 in conduction, the junction 36 between resistors R4 and R5 is held at a negative potential. On closure of switch 34, transistor Q1 goes into cut-off creating a positive-going transition at junction 36. This positive-going transition is differentiated by a series connected diode D3 and capacitor C3 to provide the initial positive voltage spike on input 30*a* to trigger delay multivibrator 30.

As described above, the output from delay multivibrator 32 appearing on line 32*b* is in the form of alternating positive and negative potential levels. To facilitate the discussion to follow, each negative potential level, with its negative-going leading edge and positive-going trailing edge will be termed a "pulse." Consequently, each negative pulse has a 6 millisecond pulse duration and is spaced 11 milliseconds apart. These negative pulses are applied to both the set and reset inputs 38*a* and 38*b*, respectively, of a flip-flop 38.

Flip-flop 38 in combination with a second flip-flop 40 comprises a two stage binary counter, indicated generally at 41. Flip-flops 38 and 40 are of conventional construction having a pair of cross-coupled electronic valves, such as transistors. As is well known in the art, the flip-flop has two stable states. One stable state is signified by the conduction of one transistor and the non-conduction of the other while the reverse condition signifies the second stable state. Flip-flops 38 and 40 also include pulse steering input circuitry such that they change from one stable state to the other on each triggering input.

Accordingly, the positive-going trailing edge of each 6 millisecond negative pulse from delay multivibrator 32 is differentiated by the input circuitry of flip-flop 38 to provide the necessary triggering pulse.

This triggering pulse is steered by the existing output condition of flip-flop 38 so as to be effective to change the flip-flop to its other stable state. The outputs from flip-flop 38 appear on lines 42 and 44 connected from the collectors of the transistors. Line 44 is connected to the set and reset inputs 40*a* and 40*b*, respectively, of flip-flop 40. Flip-flop 40 is constructed in a similar manner to flip-flop 38 such that it changes from one stable state to the other on the occurrence of each positive-going voltage transition appearing on line 44. Thus, according to the operation of a binary counter, flip-flop 38 changes its output signal levels appearing on lines 42 and 44 on each and every occurrence of the positive-going trailing edge of the 6 millisecond pulse issuing from delay multivibrator 32. Flip-flop 40 operates to change its output signal levels appearing on lines 46 and 48 on the positive-going trailing edge of alternate 6 millisecond pulses issuing from delay multivibrator 32.

The output signal levels from the flip-flops 38 and 40, and the 6 millisecond negative pulse from delay multivibrator 32 are selectively applied to a series of AND gates 50, 52 54 and 56. Specifically, output line 42 from flip-flop 38 is connected to one of the inputs to AND gates 50 and 54. Output line 44 from flip-flop 38 is connected to one of the inputs to AND gates 52 and 56. Output line 46 from flip-flop 40 is connected to each second input of AND gates 54 and 56 and output line 48 is connected to each second input of AND gates 50 and 52. The third input to each of the AND gates 50–56 is supplied by the 6 millisecond negative pulse generated by the delay multivibrator 32.

Each of the AND gates 50 through 56 is constructed in the manner illustrated for AND gate 50 seen in FIGURE 1. AND gate 50 includes three diodes D4, D5 and D6 whose anodes are connected to the respective gate inputs. The cathodes of the diodes D4–D6 are tied together and connected to the input of a driver circuit indicated generally at 58. The driver 58, as seen in FIGURE 1, includes an emitter-follower transistor Q2 and a transistor inverter Q3.

The emitter-follower transistor Q2 is connected at its emitter to a plus 9-volt supply through resistor R6. The collector and base of transistor Q2 are returned to a negative 3-volt potential through resistors R7 and R8, respectively. The emitter of transistor Q2 is tied directly to the base of transistor Q3. The emitter of transistor Q3 is grounded. It will be seen from FIGURE 1 that as long as diodes D4–D6 in AND gate 50 are back-biased, that is, negative potential levels at each of their anodes, relative to the potential at their cathodes, the base of transistor Q2 is negative with respect to its emitter so as to bias this transistor into conduction. This lowers the potential on the emitter of transistor Q2 to a level sufficient to turn transistor Q3 on. Should any of the three signal levels applied to the anodes of diodes D4–D6 be positive, that particular diode will be forward biased thereby passing a positive biasing potential to the base of transistor Q2, cutting it off. The emitter of transistor Q2 goes positive and since the base of transistor Q3 is tied directly to the emitter of transistor Q2, the former is cut off.

It is thus seen that a sufficient positive signal level applied to any of the three inputs of the AND gate 50 drives transistors Q2 and Q3 into non-conduction. On the other hand, if all of the signal levels applied to the inputs of AND gate 50 are simultaneously negative, the diodes D4–D6 are all back-biased, causing the base of transistor Q2 to go sufficiently negative with respect to its emitter so as to conduct. AND gate 50 can thus be characterized as a "negative" AND gate. The emitter of transistor Q2 likewise goes sufficiently negative to turn on transistor Q3 to apply ground potential, hereinafter termed a "pulse," through its emitter-collector circuit and a resistor R9 to a pulse routing circuit 60. This ground pulse is directed through the pulse routing circuit 60 to one of the pulse output terminals indicated at 1, 5, 9, 13 and 17 depending upon the established condition of the pulse routing circuit.

The outputs from negative AND gates 52, 54 and 56 are fed to drivers 62, 64 and 66, respectively, which are constructed in identical fashion as illustrated for driver 58. Whichever of the AND gates 52–56 receives all negative signal levels, the corresponding drivers 62–66 apply ground pulses to pulse routing circuits 68, 70 and 72 for distribution to the pulse output terminals in ordered sequence.

Still referring to FIGURE 1, the signal level from flip-flop 40 of the binary counter 41 appearing on line 48 is applied through a diode D7 to a driver 74, while the output on line 46 is applied through a diode D8 to a driver 76. Drivers 74 and 76 are constructed in the identical manner as driver 58. When the signal level on line 48 is negative, diode D7 is back-biased and driver 74 applies ground potential on line **74*a* to a control relay chain 78. Similarly, when the signal level on line 46 is negative, diode D8 is back-biased and driver 76 applies ground potential on line 76*a* to control relay chain 78. On the other hand, diodes D7 and D8 pass positive signal levels to hold drivers 74 and 76** off.

Figure 2:
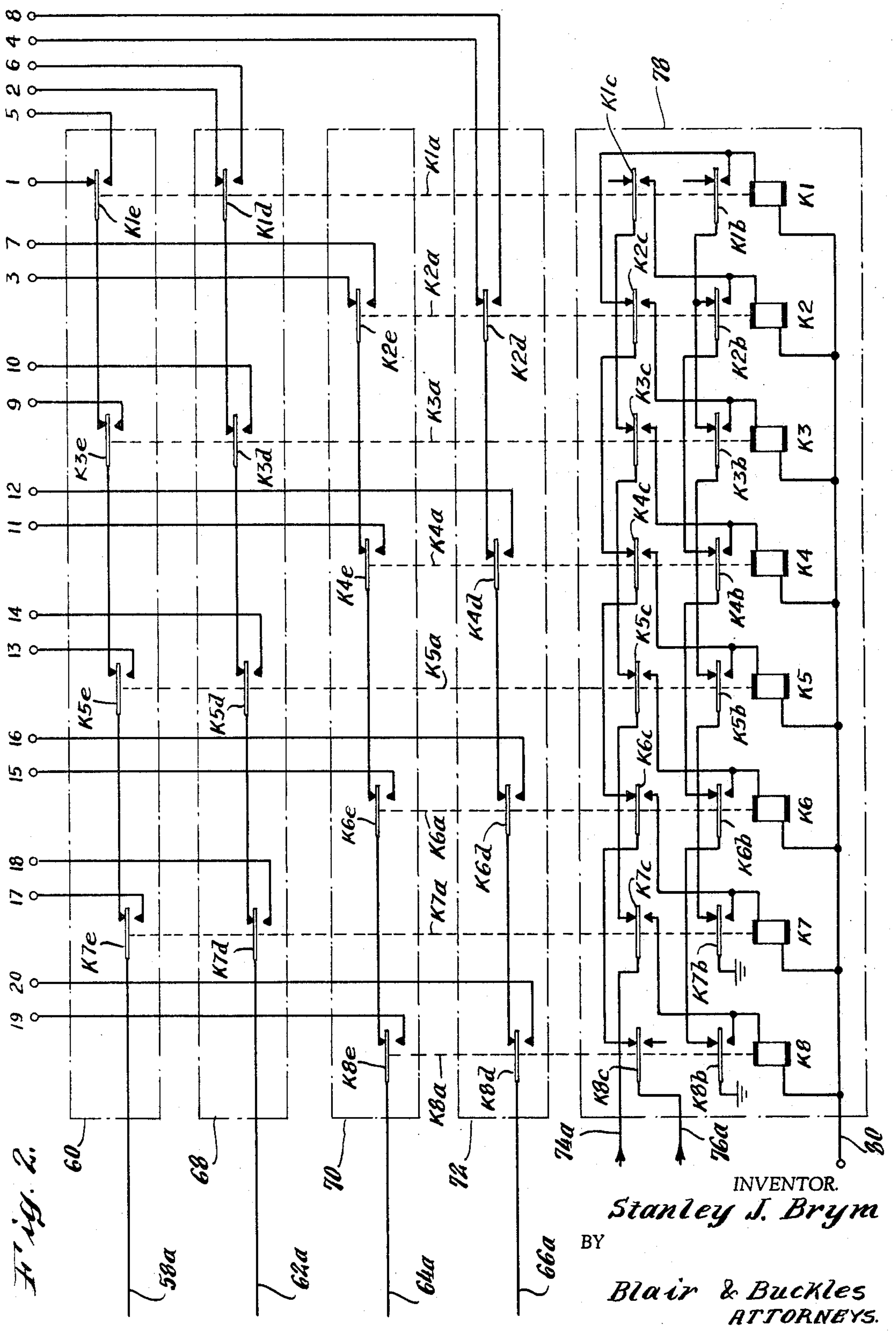
FIGURE 2 is a schematic diagram of the pulse routing circuits and control relay chain portions of FIGURE 1.

The details of the pulse routing circuits 60, 68, 70 and 72 together with the details of the control relay chain 78 are shown in FIGURE 2. The control relay chain 78 includes a plurality of relays K1–K8, each having associated transfer contacts operating in the pulse routing circuits 60, 68, 70 and 72, as well as transfer contacts operating in the individual relay energizing circuits of the control relay chain.

Considering control relay K8, its armature K8*a* is coupled to transfer contacts K8*b* and K8*c* in the control relay chain 78, transfer contact K8*d* operating in pulse routing circuit 72 and transfer contact K8*e* operating in pulse routing circuit 70. Transfer contact K8*b* is grounded to provide a holding circuit for the relay K8 through its lower contact. Transfer contact K8*c* is connected to the output line **76*a* from the driver 76**. Transfer contacts K8*d* and K8*e* are connected to the output lines **66*a* and 64*a* from drivers 66 and 64**, respectively. The lower contact of transfer contact K8*d* is connected to pulse output terminal 20 while the lower contact of transfer contact K8*e* is connected to pulse output terminal 19.

Control relay K7 includes an armature K7*a* for operating associated transfer contacts K7*b* and K7*c* in the control relay chain 78 and transfer contacts K7*d* and K7*e* in pulse routing circuits 68 and 60, respectively. Transfer contact K7*b* is grounded while transfer contact K7*c* is connected to output line **74*a* from the driver 74** of FIGURE 1. The lower contact of transfer contact K7*c* is connected to the upper terminal of relay K8 while the lower contact of transfer contact K7*b* is connected to the upper terminal of relay K7 Transfer contact K7*d* is connected to the output line **62*a* from driver 62** and transfer contact K7*e* is connected to output line **58*a* of driver 58** of FIGURE 1. The lower contact of transfer contact K7*d* is connected to the pulse output terminal 18 and the lower contact of transfer contact K7*e* is connected to pulse output terminal 17.

Similarly, control relay K6 has associated transfer contacts K6*b* and K6*c* operating in the control relay chain 78, and transfer contacts K6*d* and K6*e* operating in pulse routing circuits 72 and 70, respectively. Transfer contact K6*e* is connected to the upper contact of transfer contact K8*e*, transfer contact K6*d* is connected to the upper contact of transfer contact K8*d*, transfer contact K6*c* is connected to the upper contact of transfer contact K8*c* and transfer contact K6*b* is connected to the upper contact of transfer contact K8*b*. The lower contacts of transfer contacts K6*d* and K6*e* are connected to pulse output terminals 16 and 15, respectively. The lower contacts of transfer contacts K6*b* and K6*c* are connected to the upper terminals of relays K6 and K7, respectively.

Following the same pattern, control relay K5 has transfer contacts K5*b* and K5*c* operating in the control relay chain 78 and transfer contacts K5*d* and K5*e* operating in pulse routing circuits 68 and 60, respectively. Transfer contacts K5*d* and K5*e* are connected to the upper contacts of transfer contacts K7*d* and K7*e*, respectively. Transfer contacts K5*b* and K5*c* are respectively connected to the upper contacts of K7*b* and K7*c*. The lower contacts of transfer contacts K5*b* and K5*c* are connected to the upper terminals of relays K5 and K6, respectively.

Proceeding on down the chain, it will be seen that in pulse routing circuit 60, the upper contact of transfer contact K5*e* is connected to transfer contact K3*e* of relay K3 and the upper contact of transfer contact K3*e* is connected to the transfer contact K1*e* of relay K1. In pulse routing circuit 68, transfer contacts K5*d*, K3*d* and K1*d* are similarly interconnected. Transfer contacts K6*e*, K4*e* and K2*e* are similiarly interconnected in pulse routing circuit 70. In the same manner transfer contacts K6*d*, K4*d* and K2*d* are interconnected in pulse routing circuit 72.

The upper and lower contacts of transfer contact K1*e* are connected to pulse output terminals 1 and 5, respectively. The upper and lower contacts of transfer contact K1*d* are respectively connected to pulse output terminals 2 and 6. The upper and lower contacts of transfer contact K2*e* are respectively connected to pulse output terminals 3 and 7 while the upper and lower contacts of transfer contact K2*d* are connected to pulse output terminals 4 and 8, respectively. The lower contacts of transfer contacts K3*e*, K3*d*, K4*e*, K4*d*, K5*e* and K5*d* are connected to pulse output terminals 9 through 14, respectively.

Considering the control relay chain 78, it will be seen that the transfer contacts K8*b* through K1*b* associated with control relays K8 through K1 are effective when their associated control relays are energized to complete a holding circuit for the relay thus energized. On the other hand, transfer contacts K8*c* through K1*c* of control relays K8 through K1 operate to initially establish in sequence the energizing circuit for each of the control relays.

Still considering FIGURE 2, the lower contact of each of the transfer contacts K8*c* through K1*c* is connected to the upper terminal of the next succeedig control relay coil. Thus, the lower contact of transfer contact K1*c* is connected to the upper terminal of relay K2. Similarly, the lower contact of transfer contact K2*c* is connected to the upper terminal of control relay K3. Since in the disclosed embodiment control relay K8 is the last relay in the chain, the lower contact of transfer contact K8*c* is open.

The upper contact of each of the transfer contacts K8*c* through the K1*c* is connected to the next second preceding transfer contact of corresponding reference designation. Thus the upper contact of transfer contact K8*c* is connected to transfer contact K6*c* while the upper contact of transfer contact K7*c* is connected to the transfer contact K5*c*. Since relay K1 is the first of the chain, the upper contact of transfer contact K2*c* is connected directly to the upper terminal of relay K1. The upper contact of transfer contact K1*c* is blank. The lower terminals of all the relays K1 through K8 are returned to a negative 48-volt potential appearing on line 80 connected from the circuit side of the start switch 34 (FIGURE 1).

OPERATION

In describing the operation of FIGURES 1 and 2, it will be seen that all of the transfer contacts associated with the various control relays K1 through K8 are in engagement with their upper contacts when the control relays are de-energized and will transfer to their respective lower contacts on energization of their associated relays.

Prior to closure of the start switch 34, the existing negative potential at the collector of transistor Q1 is coupled through diodes D9, D10, and D11 to the flip-flops 38 and 40 of the binary counter 41, and also to the delay multivibrator 32. The purpose of this provision is to insure that the flip-flops 38 and 40, and delay multivibrator 32 are in their proper states when the operation of the scanner is initiated. In actual practice, this negative potential may be applied through diodes D11 and D10 to the bases of the PNP transistors directly connected to the output line 44 of flip-flop 38 and output line 46 of flip-flop 40. This negative potential insures that on initiation of scanner operation these two transistors are biased into conduction so that the output signal level on lines 44 and 46 are positive relative to the output signal levels on lines 42 and 48. Similarly, the negative potential coupled through diode D9 is applied directly to the base of a normally conducting PNP transistor of delay multivibrator 32 so as to insure that the multivibrator is in its stable state so that its output on line 32*b* is a positive signal level. The initial signal conditions of the scanner can be seen from the timing diagram of FIGURE 3.

Since this positive signal level from delay multivibrator 32 is applied to one input of each of the negative AND gates 50 through 56, the drivers 58, 62, 64, and 66 are held off. Similarly, the positive potential level on output line 46 holds the drive 76 off. On the other hand, the negative signal level on output line 48 from the binary counter turns on driver 74 to apply a ground potential to control relay chain 78. Turning to FIGURE 2, it will be seen that this ground signal level appearing on output line 74*a* is communicated through the chain of transfer contacts K7*c* to K1*c* where it dead ends at the open upper terminal of K1*c*. As a result, none of the control relays K1 through K8 is energized at this point.

Returning to FIGURE 1, closure of the start switch 34 then provides the positive going transition at junction 36 which is differentiated by the series diode D3 and capacitor C3 to provide the initiating positive triggering pulse to delay multivibrator 30. The signal level on the output line 30*b* of delay multivibrator 30 goes negative for the 11 millisecond period of this delay multivibrator. The positive-going trailing edge is differentiated by the series diode D1 and capacitor C1 to trigger delay multivibrator 32 to its unstable state for the 6 millisecond period. The output appearing on line 32*b* initially goes negative and then returns to its normal positive signal level to define the 6 millisecond negative pulse output from delay multivibrator 32.

Figure 3:
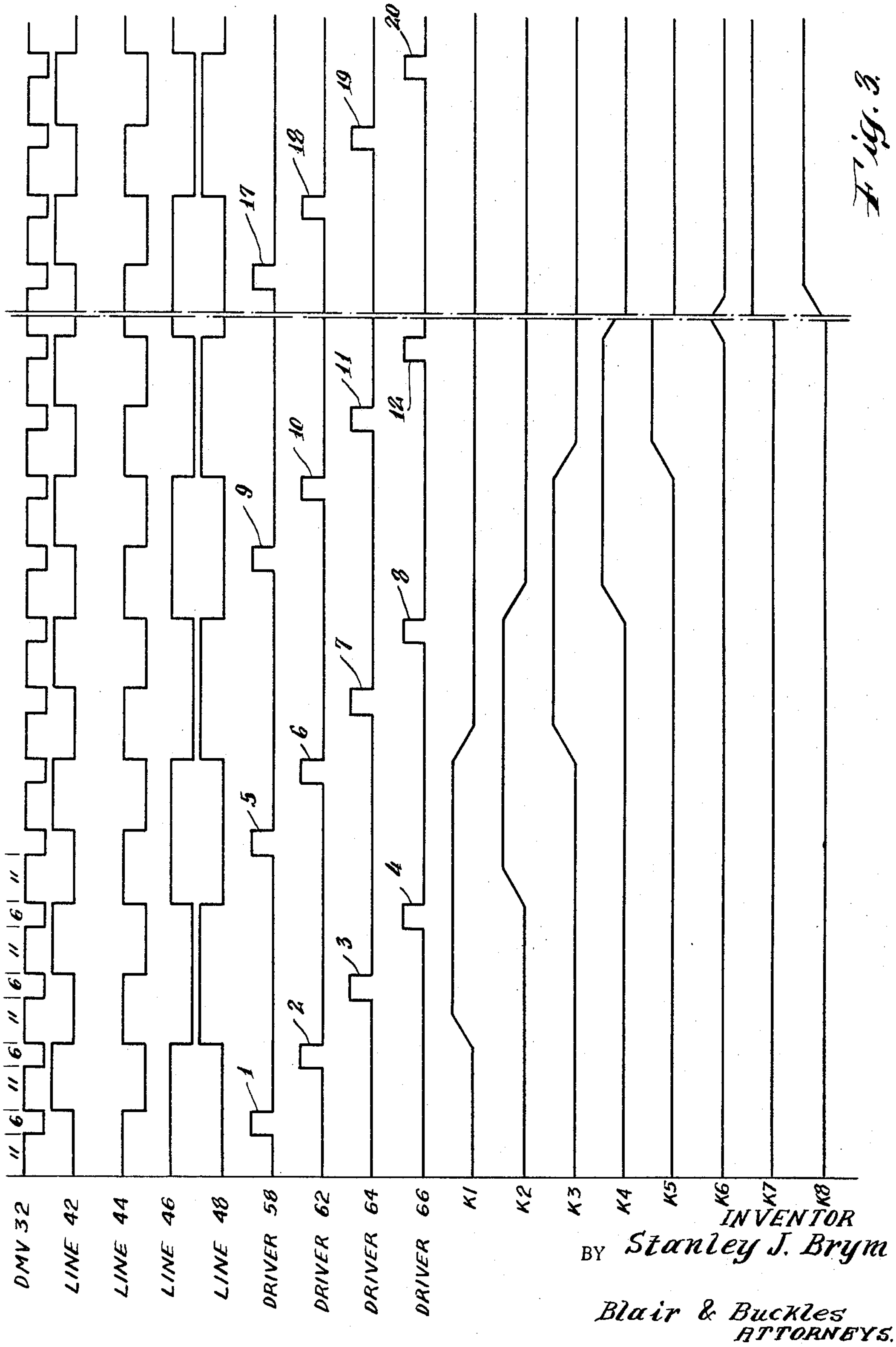
FIGURE 3 is a timing diagram illustrating the operation of components of the pulse distributing scanner of FIGURE 1.

From FIGURES 1 and 3, it will be seen that the only negative AND gate which is fully qualified during the interval of this 6 millisecond negative pulse from delay multivibrator 32 is the AND gate 50, since the output signal levels on line 42 and line 48 constituting the remaining two inputs to AND gate 50 are also negative. All other negative AND gates 52 through 56 are inhibited since at least one of the inputs derived from the counter 41 is positive. As a result, driver 58 is conditioned to apply a ground pulse on output line 58*a* to the pulse routing circuit 60. This ground pulse will have a six millisecond duration corresponding to the duration of the negative gate enabling pulse issuing from delay multivibrator 32. Turning to FIGURE 2, it will be seen that this 6 millisecond ground pulse appearing on line 58*a* is communicated through transfer contacts K7*e*, K5*e*, K3*e* and K1*e* to pulse output terminal 1.

The positive going termination of the 6 millisecond negative pulse issuing from delay multivibrator 32 is differentiated in the series diode D2 and capacitor C2 to re-trigger delay multivibrator 30. At the same time, the trailing edge of this 6 millisecond pulse triggers flip-flop 38. As a consequence, the previous signal condition on lines 42 and 44 is complemented such that line 42 goes to a positive level and line 44 goes to a negative level as seen in FIGURE 3. Since the transition on line 44 is negative going, flip-flop 40 will not be triggered and the signal conditions on lines 46 and 48 remain at positive and negative levels, respectively. Accordingly none of the control relays K1–K8 are energized.

In the meantime, delay multivibrator 30 is going through its 11 millisecond period during which the positive signal level on line 32*b* from delay multivibrator 32 inhibits the AND gates 50–56. As delay multivibrator 30 returns to its stable state, delay multivibrator 32 is triggered to generate another 6 millisecond negative pulse. Now negative AND gate 52 is fully qualified and driver 62 provides a 6 millisecond ground pulse on its output line 62*a*. Again turning to FIGURE 2, this 6 millisecond ground pulse is communicated through transfer contacts K7*d*, K5*d*, K3*d* and K1*d* to pulse output terminal 2.

The trailing edge of this second 6 millisecond negative pulse changes the state of flip-flop 38 and also changes the state of flip-flop 40 since the transition on line 44 is from a negative to a positive signal level. Consequently, the signal level on output line 46 goes negative while the potential level on line 48 goes positive as seen in FIGURE 3. Accordingly, driver 74 is turned off and driver 76 is turned on to apply a ground signal on output line 76*a*. Control relay K1 is then operated since its upper terminal is returned to ground through transfer contacts K2*c*, K4*c*, K6*c*, K8*c* and driver 76. A holding circuit for control relay K1 is then latched in through transfer contacts K1*b*, K3*b*, K5*b* and K7*b* to ground.

The third negative 6 millisecond pulse from delay multivibrator 32 serves to fully qualify negative AND gate 54 and turn on driver 64, as seen in FIGURE 3, to develop a 6 millisecond ground pulse on output line 64*a*. In FIGURE 2, it will be seen that this ground pulse is communicated through transfer contacts K8*e*, K6*e*, K4*e*, and K2*e* of pulse routing circuit 70 to pulse output terminal 3. It will be seen that the operation of control relay K1 has no effect at this point since its associated transfer contacts are operating only in pulse routing circuits 60 and 68, which have already distributed pulses to pulse output terminals 1 and 2.

The trailing edge of the third negative pulse from delay multivibrator 32 triggers flip-flop 38 to produce the counter output signal levels seen in FIGURE 3. AND gate 56 becomes partially qualified in advanced preparation for the generation of the next negative pulse from delay multivibrator 32. This next 6 millisecond negative pulse then fully qualifies AND gate 56 turning on driver 66 to produce a 6 millisecond ground pulse on line 66*a*. This ground pulse is routed to pulse output terminal 4 through transfer contacts K8*d*, K6*d*, K4*d*, and K2*d* of the pulse routing circuit 72 detailed in FIGURE 2.

On the termination of the fourth 6 millisecond ground pulse appearing at pulse output terminal 4, the states of the flip-flops 38 and 40 of the binary counter 41 are again changed by the trailing edge of the negative pulse output from delay multivibrator 32 so as to duplicate the signal levels appearing on lines 42 through 48 prior to the generation of the first ground pulse appearing at pulse output terminal 1 as seen in FIGURE 3. Since the signal level on line 48 is again negative, driver 74 is activated to ground its output line 74*a*. Tracing through the transfer contacts in the control relay chain 78, it will be seen that the energizing circuit for control relay K2 is now completed, and it operates its associated transfer contacts to make the circuits through their lower contacts. At this point, both relays K1 and K2 are energized; relay K1 through the holding circuit path completed by its own transfer contact K1*b* to ground at transfer contact K7*b* and relay K2 through transfer contact K1*c* to ground at the driver 74. Pulse routing circuits 70 and 72 are now prepared to distribute the seventh and eighth ground pulses to pulse output terminals 7 and 8, respectively.

The fifth 6 millisecond negative pulse from delay multivrator 32 fully qualifies negative AND gate 50 to provide the 6 millisecond ground pulse on line 58*a* of driver 58. Tracing through the pulse routing circuit 60 of FIGURE 2, it will be seen that this ground pulse is routed through to the lower contact of transfer contact K1*e* and to pulse output terminal 5. The counter 41 is again triggered and on the next cycle of delay multivibrator 32, AND gate 52 is qualified. Driver 62 provides the 6 millisecond ground pulse which is routed through the pulse routing circuit 68 of FIGURE 2 to the lower contact of transfer relay K1*d* and pulse output terminal 6.

It will thus be noted that on the termination of the sixth ground pulse, the binary counter 41 is again triggered and driver 76 is activated so as to complete the energization circuit for control relay K3 through transfer contact K2*c*. Operation of control relay K3 breaks the holding circuit for control relay K1 at transfer contact K3*b* causing the K1 transfer contacts to break their lower contacts and make their upper contacts. At this point, control relays K2 and K3 are energized; relay K2 through the holding circuit to ground perfected by its own transfer contact K2*b*, and relay K3 from the driver 76 through the transfer contact K2*c*.

From the operation thus far described and from the continued operation of the scanner illustrated in FIGURE 3, it will be noted that the counter 41 operates in response to signal transitions. On the other hand, the various AND gates and drivers operate in response to signal levels. Thus, the signal transition constituting the trailing edge of a 6 millisecond pulse output from delay multivibrator effects the necessary switching of the counter 41 so that the negative level of the next 6 millisecond pulse together with the then existing signal levels from the counter accomplish the necessary gating functions. Accordingly, the uniform character of the pulse outputs is precisely determined by the negative pulses issuing from delay multivibrator 32. The AND gates 50 through 56 are thus qualified by signal levels in repeating sequence, thereby actuating the drivers 58, 62, 64 and 66 in corresponding repeating sequence. During the period prior to the actuation of drives 58 and 62, driver 74 is actuated by the signal level on line 48 to condition the pulse routing circuits 70 and 72 so that when AND gates 54 and 56 are qualified later in the sequence, the pulses will be routed to the appropriate output terminals. Similarly, prior to the actuation of drivers 64 and 66 in sequence, driver 76 is actuated by the signal level on line 46 to condition the pulse routing circuits 60 and 68 so that they will be prepared well beforehand to properly route the ground pulses developed by drivers 58 and 62 following in sequence after operation of drivers 64 and 66.

Immediately after the ground pulses have been routed to appropriate pulse output terminals through particular transfer contacts, their associated control relays are dropped out in sequence by operation of succeeding relays.

As seen in FIGURE 2, to route the 17th and 18th pulses to output terminals 17 and 18, control relay K7 had operated to cause associated transfer contacts K7*e* and K7*d* to make their lower contacts. In addition, grounded transfer contact K7*b* latches in the holding circuit for relay K7. Subsequently, the driver 74 is actuated to operate relay K8 through transfer contact K7*c* in preparation for the distribution of the 19th and 20th pulses to pulse output terminals 19 and 20. Similarly, relay K8 is latched in through its associated transfer contact K8*b* to ground.

Returning to FIGURE 1, the terminal 81 between the diode D2 and capacitor C2 in the feedback path between the output 32*b* of delay multivibrator 32 and the input 30*a* of delay multivibrator 30 is connected to the cathode of a diode D12. The anode of diode D12 is connected to a junction 82 of a potential divider comprised of resistors R10, R11 and R12 connected between a plus 9 volts and a negative 48 volts. A junction 84 between resistors R11 and R12 is tied to the pulse output terminal 20 of the pulse routing circuitry 72 seen in FIGURES 1 and 2. As long as the pulse output terminal 20 is floating, that is, an absence of a ground pulse, junction 82 of the potential divider is at a negative potential so as to back bias diode D12. As a result, the positive going transitions of the trailing edges of the 6 millisecond negative pulses issuing from delay multivibrator 32 by virtue of diode D2 and capacitor C2 provide a positive triggering pulse of sufficient amplitude to again trigger delay multivibrator 30.

When the 20th ground pulse appears at pulse output terminal 20, the junction 84 is clamped to ground. Junction 82 rises to a positive potential to forward bias diode D12. The junction 81 goes positive to prevent capacitor C2 from charging through the back resistance of diode D2. Consequently, the trailing edge of the pulse is ineffective to trigger multivibrator 30. As a result, after generation of the 20th ground pulse recycling operation of delay multivibrators 30 and 32 is inhibited and operation of the scanner terminates. It will be recalled that the control relays K7 and K8 were latched in by their associated transfer contacts K7*b* and K8*b*, thus in order to start a complete new cycle of scanner operation, the start switch 34 must be opened to break the circuit between the negative 48 volts at the start switch to the lower terminals of the control relays.

The invention thus provides a pulse distributor ideally suited for application as a scanner in data handling systems. Each of the pulse routing circuits 60, 68, 70 and 72 are assigned particular pulses for distribution. With four such pulse routing circuits, each is assigned to distribute every fourth pulse. However, it is contemplated that the scanner can be expanded to include a greater number of pulse routing circuits and thereby increase the number of pulse output terminals. It will be noted that if the number of pulse routing circuits is increased, additional flip-flop stages must be added to the counter 41.

An alternative and preferred method of expanding the capacity of the scanner is to merely add additional control relays to the control relay chain 78. The interconnection of the transfer contacts associate with alternate control relays, as disclosed in FIGURE 2, can be continued on indefinitely to provide for any desired number of pulse output terminals. In one actual embodiment, the control relay chain 78 was expanded to thirteen relays permitting the scanner to accommodate thirty pulse output terminals. Since the transfer contacts of each control relay are connected to two pulse output terminals, except for each of the first two which have transfer contacts connected to four pulse output terminals, it will be seen that, according to the teachings of the present invention, two times the number of control relays plus four gives the number of pulse output terminals which can be accommodated.

Since the transfer contacts connected in the pulse routing circuits are operated when their pulse input drivers are off, it will be seen that the speed of the scanner is not limited by slow transfer contact pick-up and drop-out times. As seen in FIGURE 3, operation of the transfer contacts K1*e* and K1*d* begins 45 milliseconds before they communicate pulse outputs to pulse output terminals 5 and 6, respectively. Accordingly, inexpensive relays can be used. Moreover, the transfer contacts are impotent when they are switched, thereby greatly increasing contact life and completely eliminating switch noise.

The disclosed timing of the scanner operation determined by the output from delay multivibrator 32 is intended as illustrative of the invention and not in a limiting sense. The pulse output rate of the scanner may be readily varied from as low as 30 to in excess of 300 pulses per second merely by adjusting the periods of delay multivibrators 30 and 32. It is contemplated that the particular logic circuitry may be varied without departing from the invention. Moreover, the character of the pulse outputs is considered incidental to the invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A scanner comprising, in combination:
   - (A) a plurality of pulse routing circuits having
     - (1) first pluralities of interconnected switches for distributing pulses to a plurality of output terminals in ordered sequence;
   - (B) a control circuit having
     - (1) second pluralities of interconnected switches,
       - (a) selective switches of said first and second pluralities comprising a series of switch sets,
       - (b) selected switches of said first pluralities of each switch set being interconnected in less than all of said pulses routing circuits,
     - (2) a corresponding series of relays selectively operating each one of said switch sets;
   - (C) electronic means

- (1) introducing said pulses in predetermined repetitive sequence to said pulse routing circuits for distribution according to the condition of said first pluralities of switches,
     - (2) successively energizing said relays according ing to the condition of said second pluralities of switches such that the operation of each of said switch sets having switches interconnected in certain of said pulse routing circuits is timed to occur out of phase with the introduction of pulses to each of said certain pulse routing circuits in each sequence.

2. The device claimed in claim 1 and
   - (D) means responsive to the final pulse in said order sequence for disabling said electronic means.

3. The device claimed in claim 1 wherein said electronic means includes
   - (C) (3) a pulse generator generating a series of timing pulses,
   - (4) a plurality of gates, each gate having
     - (a) its output connected to one of said pulse routing circuits.
     - (b) one input derived from said series of timing pulses, and
   - (5) a counter responsive to said series of timing pulses for developing sequentially varying outputs to
     - (a) enable said gates in repetitive sequence, and
     - (b) successively energize said relays.

4. The device defined in claim 3 wherein
   - (B) (c) selected switches of said second pluralities are interconnected to provide holding circuits to maintain individual switch sets in their operated conditions for the period covering the time during which pulses are being distributed by the switches of said first pluralities associated with the operated switch set.

5. In a scanner having timing circuit means for producing a series of timing pulses and counting circuit means for producing sequential varying outputs, the combination of
   - (A) pluralities of interconnected first switches forming plural pulse routing chains,
     - (1) each first switch having a pulse input contact and plural pulse output contacts;
   - (B) pluralities of interconnected second switches forming plural energization chains,
     - (1) each one of said second switches being coupled to a different one of said first switches to form a series of switch sets;
   - (C) an actuating means for operating each of said switch sets, each said actuating means being
     - (1) initially energized through one of said energization chains and
     - (2) temporarily held energized through a second one of said energization chains;
   - (D) pulse gating means for pulsing individual pulse routing chains according to a first repeating sequence, said gating means
     - (1) being responsive to said timing circuit means and said counting circuit means; and
   - (E) energization gating means for energizing said actuating means according to a second sequence
     - (1) said energization gating means being connected to said counting circuit means
     - (2) the timing relationship of said first repeating sequence and said second sequence being phased such that a first switch of any one pulse routing chain is always operated prior to the pulsing of said any one pulse routing chain.

6. The combination defined in claim 5; and
   - (A) (2) of said first switches in each pulse routing chain
     - (a) the input contact of each is connected to an output contact of the succeeding one,
     - (b) the input contact of the last being connected to the output of one of said pulse gating means, and (c) at least one output contact of each being connected to individual pulse output terminals, (3) said input contacts of each of said first switches being movable between output contacts by said actuating means 7. The combination defined in claim 6; and (B) (2) each said second switch having an input contact and plural output contacts (3) of said second switches connected in each energization chain, (a) the input contact of each is connected to an output contact of the succeeding one, (b) an output contact of each being connected to selected ones of said actuating means, (4) the input contact of the last of said second switches in those energization chains initially energizing said actuating means being connected to the output of said energization gating means, (5) the input contact of the last of said second switches in those energization chains temporarily holding said actuating means energized being connected to an energizing source, and (6) said input contacts of each of said second switches being movable between output contacts by said actuating means.

8. The combination defined in claim 7 wherein said actuating means are relays.

9. A pulse distributing scanner for application in data handling systems, said scanner comprising, in combination:

(A) first, second, third and fourth pulse routing circuits, (1) each of said pulse routing circuits being assigned a plurality of pulses for distribution to a corresponding plurality of pulse output terminals in ordered sequence;

(B) a control relay chain including (1) a first series of relays each having (a) associated first and second transfer contacts respectively interconnected in said first and second pulse routing circuits, (i) said first and second transfer contacts having contacts connected to individual ones of said pulse output terminals, (2) a second series of relays each having (a) associated first and second transfer contacts respectively interconnected in said third and fourth pulse routing circuits, (i) said first and second transfer contacts having contacts connected to individual ones of said pulse output terminals;

(C) a pulse generator for generating a series of timing pulses;

(D) a counting circuit responsive to said timing pulses for developing a repeating sequence of output signal levels;

(E) first, second, third and fourth gating circuits connected to said first, second, third and fourth pulse routing circuits, respectively, (1) said gating circuits being responsive to combinations of said signal levels and said timing pulses for introducing said pulses to said pulse routing circuits, (a) said pulses being introduced to said first, second, third and fourth pulse routing circuits in repeating sequence, (b) said pulses being distributed in said first and second pulse routing circuits while said third and fourth pulse routing circuits are being prepared by operation of a relay of said second series to distribute succeeding pulses in one sequence, (c) said pulses being distributed in said third and fourth pulse routing circuits while said first and second pulse routing circuits are being prepared by operation of a relay of said first series to distribute succeeding pulses in the next sequence.

10. The combination defined in claim 9 wherein (B) (b) said relays of said first and second series each having third and fourth transfer contacts, (i) said third transfer contacts of alternate relays being interconnected to provide first and second energization circuits for said relays, (ii) said fourth transfer contacts of alternate relays being interconnected to provide first and second holding circuits for said relays; and (F) first and second gating means respectively connected to said first and second energization circuits, said first and second gating means (1) being responsive to said signal levels from said counting circuit for alternately completing said first and second energization circuits to operate said relays in succession (2) operation of said fourth transfer contacts completing one of said first and second holding circuits for said operated relay.

11. The combination defined in claim 10 wherein said counting circuit operates to vary its output signal levels on the trailing edge of each timing pulse and said gates introducing a pulse to a predetermined one of said pulse routing circuits on the occurrence of the next timing pulse (E) (2) said one pulse routing circuit being determined by the character of said signal levels existing on the occurrence of the next timing pulse.

12. An electronic scanner comprising, in combination:

(A) a timing pulse generator for generating a series of discrete, uniformly spaced timing pulses;

(B) electronic counting means for producing a repeating sequence of varying signal level combinations in response to said timing pulses, (1) variations in said signal level combinations occurring on the trailing edge of each timing pulse;

(C) a plurality of gates, (1) each gate having inputs comprised of said timing pulses and predetermined signal levels of said signal level combinations, (D) a pulse routing circuit connected to the output of each gate, (1) each pulse routing circuit comprising a series of routing switches having a transfer contact and first and second contacts, (a) the transfer contact of the last routing switch in each said pulse routing circuits being connected to the output of one of said gates, (b) said first contact of each routing switch being connected to the transfer contact of each preceding routing switch, (i) except for the first routing switch which has its first contact connected to a pulse output terminal, (c) said second contact of each routing switch being connected to a pulse output terminal;

(E) a holding circuit having an alternately interconnected series of holding switches, each switch having a transfer contact and first and second contacts, (a) the transfer contact of each holding switch, beginning with the two initial holding switches, connected to the first contact of the second next succeeding holding switch, (i) except for the two terminating holding switches, the transfer contacts of which are connected to one side of an energizing source;

(F) an energizing circuit comprising (1) an alternating interconnected series of energization switches each having a transfer contact and first and second contacts, (2) the transfer contact of each energization switch, beginning with the two initial energization switches, connected to the first contact of the second next succeeding enerization switch, (a) except for the two terminating energization switches, the transfer contacts of which are connectable to one side of an energizing source;

(G) a chain of control relays, (1) each relay being operable, on energization, to transfer the transfer contact from the first contact to the second contact of the associated ones of said holding switches, one of said energization switches and at least one of said routing switches, (2) each relay having a first terminal connected to the other side of an energizing source, (3) each relay having a second terminal connected to the second contact of its associated holding switch and to the second contact of the energization switch associated with the next preceding relay, (a) except for the initial relay, the second terminal of which is connected to the first contact of the energization switch associated with the next succeeding relay;

(H) gating means responsive to particular signal levels from said counting means for alternately connecting the transfer contacts of said two terminating energization switches to the one side of said energizing source;

(I) whereby pulses are introduced to said pulse routing circuits in repeating sequence by said gates and said relays are energized in succession by operation of said gating means so as to distribute pulses to said pulse output terminals in sequence, the operation of said gates and said gating means being coordinated such that the transfer contacts of said routing switches are transferred only during periods when pulses are not being distributed therethrough.

13. The combination defined in claim 12 and;

(J) driver circuits connected to the outputs of said gates and said gating means.

14. The combination defined in claim 12 wherein said timing pulse generator includes (A) (1) a first delay multivibrator triggered to provide a first pulse output and (2) a second delay multivibrator responsive to the trailing edge of said first output for generating one of said timing pulses (a) the trailing edge of said one timing pulse being effective to retrigger said first multivibrator, (3) whereby the time interval between timing pulses is determined by the duration of said first pulse output.

15. The combination defined in claim 14 wherein the last distributed pulse is applied to the output circuit of said second delay multivibrator so as to inhibit the retriggering of said first delay multivibrator.

16. In a scanner, in combination, (A) a plurality of pulse routing circuits, (1) each of said circuits comprising interconnected routing switches having a plurality of output terminals;

(B) a plurality of actuating means for operating selected of said routing switches;

(C) control circuit means (1) including control switches for sequentially energizing said actuating means;

(D) electronic counting circuit means, (1) having outputs for operating said control circuit means sequentially;

(E) electronic timing means having pulse outputs for triggering said counting circuit means; and (F) a plurality of gates, (1) each having inputs from (a) said counting circuit means (b) and said timing means, and (2) each having an output connected to one of said pulse routing circuits.

(G) whereby pulses are applied to said pulse routing circuits for distribution to said output terminals in a timed cycling sequence such that said routing switches in any given pulse routing circuit are operated only when no pulses are applied thereto.

References Cited

UNITED STATES PATENTS

| | | | |
|---|---|---|---|
| 2,895,124 | 7/1959 | Harris. | |
| 3,142,041 | 7/1964 | Mancuso | 340—166 XR |
| 3,183,365 | 5/1965 | Ligoty | 328—103 XR |

JOHN W. CALDWELL, *Primary Examiner.*

D. YUSKO, *Examiner.*